(12) United States Patent
Freudenberger et al.

(10) Patent No.: US 6,993,754 B2
(45) Date of Patent: Jan. 31, 2006

(54) ANNOTATIONS TO EXECUTABLE IMAGES FOR IMPROVED DYNAMIC OPTIMIZATION FUNCTIONS

(75) Inventors: Stefan M. Freudenberger, Brookline, MA (US); Evelyn Duesterwald, Somerville, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 709 days.

(21) Appl. No.: 09/992,642

(22) Filed: Nov. 13, 2001

(65) Prior Publication Data

US 2003/0093780 A1    May 15, 2003

(51) Int. Cl.
*G06F 9/45* (2006.01)

(52) U.S. Cl. ..................... 717/153; 717/154

(58) Field of Classification Search ............... 717/136, 717/151–161, 140–148
See application file for complete search history.

(56) References Cited

U.S. PATENT DOCUMENTS

| | | | |
|---|---|---|---|
| 6,077,314 A * | 6/2000 | Ng | 717/159 |
| 6,219,832 B1 * | 4/2001 | Buzbee | 717/153 |
| 6,357,040 B1 * | 3/2002 | Porter | 717/154 |
| 6,438,747 B1 * | 8/2002 | Schreiber et al. | 717/160 |
| 6,505,344 B1 * | 1/2003 | Blais et al. | 717/151 |
| 6,704,925 B1 * | 3/2004 | Bugnion | 717/138 |
| 6,738,967 B1 * | 5/2004 | Radigan | 717/146 |

OTHER PUBLICATIONS

U.S. Patent Appl. Ser. No. 09/924,260 filed Aug. 8, 2001 for "Dynamic Execution Layer Interface For Explicitly Or Transparently Executing Application or System Binaries" of Evelyn Duesterwald et al.

* cited by examiner

*Primary Examiner*—Kakali Chaki
*Assistant Examiner*—Lawrence Shrader

(57) ABSTRACT

A method of optimizing a computer program includes generating annotation information about the computer program, storing the annotation information with the computer program, and dynamically optimizing the computer program based on the annotation information while the computer program is being executed.

23 Claims, 3 Drawing Sheets

| Annotation Information: | |
|---|---|
| The identity of a unique stack pointer register | 70 |
| A list of non-ambiguous memory locations | 72 |
| A mapping of memory references or accesses to all the non-ambiguous locations which are referenced in a stack frame's scope | 74 |
| A list of canonical names of stack frame locations that are promotable | 76 |
| The guarantee that no stack frame location is live beyond the scope of the stack frame | 80 |
| Format and location of stack unwinding information | 82 |

*Prior Art*

| Annotation Information: |
|---|
| The identity of a unique stack pointer register |
| A list of non-ambiguous memory locations |
| A mapping of memory references or accesses to all the non-ambiguous locations which are referenced in a stack frame's scope |
| A list of canonical names of stack frame locations that are promotable |
| The guarantee that no stack frame location is live beyond the scope of the stack frame |
| Format and location of stack unwinding information |

| Enabled Optimizations: |
|---|
| Removal of redundant callee-save register restores |
| Propagation of constant arguments |
| Promotion of local data from a stack frame location to a register |
| Removal of redundant callee register saves |
| Removal of stack frame allocation |

ANNOTATIONS TO EXECUTABLE IMAGES FOR IMPROVED DYNAMIC OPTIMIZATION FUNCTIONS

FIELD OF THE INVENTION

This invention relates generally to computer systems and more specifically to annotating images which are executable on computer systems for improved optimizing such as dynamic inlining of functions.

BACKGROUND

As is generally known, computers are used to manipulate data under the control of software. Software is typically written in a high level programming language such as C, which is then compiled by a compiler program into binary machine language instructions which can be executed by a central processing unit in the computer. Software written in programming languages other than the machine language instructions are relatively much easier to understand and use. A very common strategy to simplify computer programming is to group frequently called portions of a program in subroutines, or functions, which perform a certain task. Functions may generally be called or executed as needed from anywhere else in the program each time the task is to be performed. Thus, rather than repeating the program instructions for the task each time the task is performed, the program instructions appear only once in the software, reducing the size of the resulting software.

However, including functions in software can have a negative impact on the performance of the software. Information must often be passed along to the functions as formal parameters, and functions may return information as return values. Passing formal parameters and return values to and from functions requires that a compiler generate additional machine language instructions, making extra work which slows the computer. Additionally, each time a function is called, the computer must save the state of the processor before jumping to the function in the program, in effect saving its place before executing the function. Once the function has finished executing, the computer must restore the state of the processor before returning to the instruction following the function call. These additional tasks can greatly slow the execution of software, particularly if the software includes many small functions. In the extreme, these additional tasks such as passing parameters and return values and saving the state of the processor can be more work for the processor than the actual function.

Most compilers include optional optimization tools which give the programmer the option of optimizing the software for speed as it is compiled. One such tool, called inlining, replaces function calls with the body of the function each time the function call appears. Thus multiple copies of a function will appear inline with the rest of the program, rather than being a single independent copy which can be called from multiple places. Actual arguments to an operation are substituted for formal parameters and the state-saving instructions are omitted. Since this increases the size of the software, compilers typically attempt to determine which functions would be good candidates for inlining and which are not. The criteria used by compilers include information such as the size of a function, the frequency with which it is called, and the number of places from which it is called. For example, large functions which are called infrequently but from many points, or call sites, in a program would be poor candidates for inlining as they would greatly increase the size of the software. In contrast, small functions which are called frequently from only a few call sites would be good candidates for inlining.

However, the traditional software environment in which a program is written, compiled, then executed on a single type of computer is changing with the increasing desire for hardware independent software which can be executed on multiple different types of computers. To achieve hardware independence in software, software is typically either manipulated after compilation (e.g., translated) or is compiled piecemeal as the software is executed.

Another departure from the traditional compilation environment is dynamic translation, wherein software in binary machine language form, written for execution on a first type of computer, is translated as it is executed on a second type of computer. Dynamic translators operate by translating each word of the non-native code into a corresponding word or words of native code for execution by the computer. However, dynamic translators do not scan, evaluate and modify software before executing, and thus do not have detailed information about the software prior to execution. Without additional information about the code it is very difficult, if not impossible, to achieve full inlining of the program to improve performance, particularly in machine language code.

A need therefore exists for a method of enabling function inlining and related optimizations during execution of a program, whether native or non-native to the computer. A further need exists for a method of enabling function inlining and related optimizations during execution of a program in machine language binary format. A further need exists for a method of providing information about an executing program to facilitate dynamic optimization of the program.

SUMMARY

The inventors have met these and other needs by creating a system of annotating compiled software to enable aggressive dynamic inlining of subroutines and other related optimizations. As the software is compiled, the compiler annotates the compiled code to include information about the compiled code. The annotation information is derived from: (a) the runtime architecture and software conventions that the compiler uses to compile the program; and (b) information the compiler has about references to individual memory locations. A dynamic optimizer or inliner then reads these annotations during execution to replace function calls with inline functions or to perform related optimizations.

Thus, the invention may comprise a method of optimizing a computer program, including generating annotation information about the computer program, storing the annotation information with the computer program, and optimizing the computer program based on the annotation information while the computer program is being executed.

The invention may also comprise a method of enabling optimization of a computer program, including generating annotation information about the computer program and storing the annotation information with the computer program.

The invention may also comprise a method of optimizing a computer program, including reading annotation information stored with the computer program, and optimizing the computer program based on the annotation information while the computer program is being executed.

The invention may also comprise an apparatus for enabling optimization of a computer program, the apparatus including one or more computer readable storage media storing computer executable instructions. The computer executable instructions include instructions for generating annotation information about the computer program and instructions for storing the annotation information with the computer program.

The invention may also comprise an apparatus for optimizing a computer program, the apparatus including one or more computer readable storage media storing computer executable instructions. The computer executable instructions include instructions for reading annotation information stored with the computer program and instructions for optimizing the computer program based on the annotation information while the computer program is being executed.

BRIEF DESCRIPTION OF THE DRAWINGS

Illustrative and presently preferred embodiments of the invention are shown in the accompanying drawing, in which:

FIG. 5 is an illustration of the types of information which may be included in an exemplary annotation; and FIG. 6 is an exemplary illustration of the types of optimizations which may be performed based on the information of FIG. 5.

DESCRIPTION OF THE PREFERRED EMBODIMENTS

Figure 1:
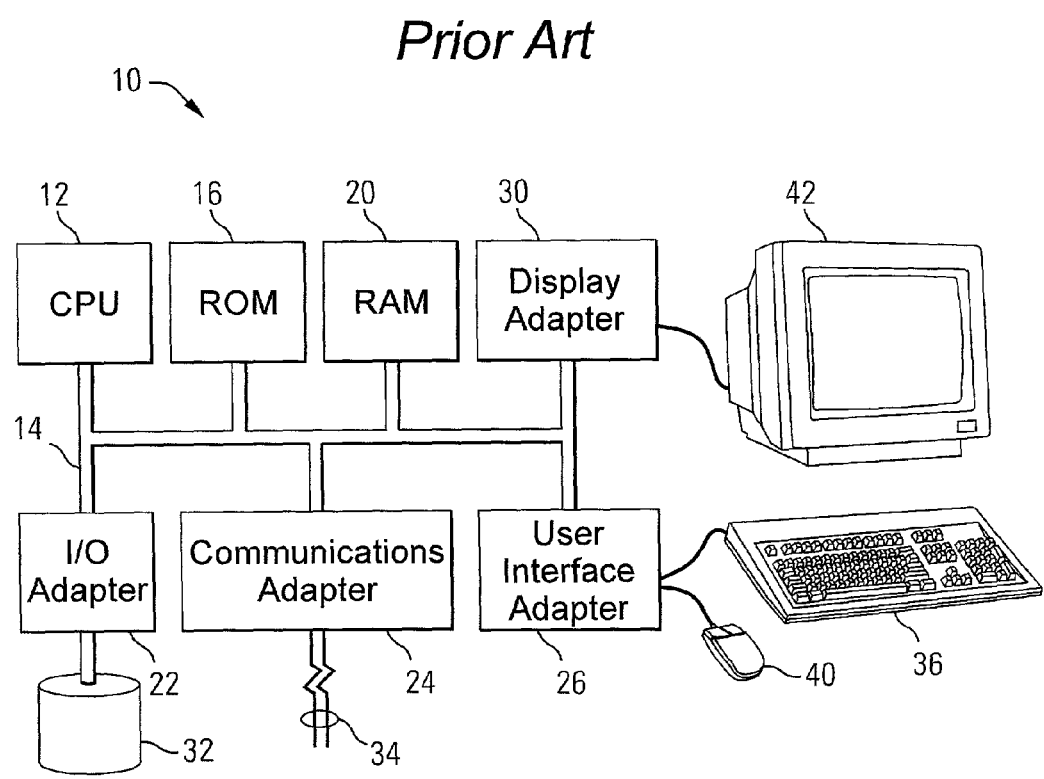
FIG. 1 is an exemplary block diagram of a prior art computer system which may be used to annotate executable images to facilitate dynamic inlining of functions.

A typical computer system which may be used to annotate and optimize executable images is illustrated in the block diagram of FIG. 1. A computer system 10 generally includes a central processing unit (CPU) 12 connected by a system bus 14 to devices such as a read-only memory (ROM) 16, a random access memory (RAM) 20, an input/output (I/O) adapter 22, a communications adapter 24, a user interface adapter 26, and a display adapter 30. Data storage devices such as a hard drive 32 are connected to the computer system 10 through the I/O adapter 22. In operation, the CPU 12 in the computer system 10 executes instructions stored in binary format on the ROM 20, on the hard drive 32, and in the RAM 16, causing it to manipulate data stored in the RAM 16 to perform useful functions. The computer system 10 may communicate with other electronic devices through local or wide area networks (e.g., 34) connected to the communications adapter 24. User input is obtained through input devices such as a keyboard 36 and a pointing device 40 which are connected to the computer system 10 through the user interface adapter 26. Output is displayed on a display device such as a monitor 42 connected to the display adapter 30.

A computer program, as defined in this description, which may be executed on the computer system 10 refers to any collection of computer executable instructions, which may be in the form of one or many binary executable files or one or many higher level software files, etc., and which may perform a single task or many unrelated tasks. The collection of computer executable instructions in the computer program may have been prepared and grouped at one time, or may include multiple different parts which were prepared at different times.

Dynamic optimization of a computer program executing on a computer system 10 is greatly enhanced by adding annotations to the executable image of the program. The term executable image refers herein to the computer executable instructions of a computer program, stored in any form. For example, the executable image may comprise a binary executable file stored on a hard drive. A dynamic optimizer refers to any system which improves the efficiency of a computer program while it is being executed, for example by making the program execute more rapidly.

Annotation information, as the phrase is used herein, refers to information derived from (a) the runtime architecture and software conventions for the computer program; and (b) information about references to individual memory locations in the computer program. The runtime architecture and software conventions include such things as the identity of the register containing the stack pointer. Since the stack pointer register is not dictated by most hardware architectures, the identity of the memory stack pointer register is part of the runtime architecture and software conventions. The runtime architecture and software conventions also include information about the structure and layout of the memory stack frame.

In one preferred embodiment, the dynamic optimizer is part of a dynamic execution layer such as that described in U.S. patent application Ser. No. 09/924,260 for a "Dynamic Execution Layer Interface for Explicitly or Transparently Executing Application or System Binaries," filed Aug. 8, 2001, which is incorporated herein by reference for all that it discloses. The dynamic execution layer is a software layer that executes between the program and the computer hardware in order to transform the program. The dynamic execution layer intercepts instructions from the executable image of the program before they are executed by the hardware and transforms them, such as to optimize them, translate them, provide virtual support for missing hardware, or any number of desirable tasks. The program executed through a dynamic execution layer may therefore be written in instructions which are either native to the computer hardware or non-native. The dynamic execution layer may also cache transformed code segments to improve execution speed of code segments which are repeatedly executed.

The dynamic execution layer attempts to identify program hot spots at runtime in order to cache their optimized versions for future reuse, thereby improving program performance significantly. The granularity of the selected hot spot can vary between a single block (or straight-line sequence of code without any intervening branches) and an entire function. Note that the terms function, procedure, and subroutine are used interchangeably herein to refer to any section of code which can be called and executed within a program, and which may or may not return to the instruction immediately following the call. A common granularity is a dynamic trace, which is a single-entry multi-exit sequence of code blocks. Traces offer a fairly large optimization scope while still having simple control flow, which makes optimizing them much easier than a procedure. A dynamic trace can go past several procedure calls and returns, including dynamically linked libraries (DLLs). This allows the dynamic execution layer to optimize the traces by performing inlining, removing redundant call and return branches, and other related optimizations.

The exemplary dynamic execution layer described above can operate transparently, that is, it can transform executable images or binaries without recompiling or otherwise specially preparing them. However, without any additional information about the code in the computer program it is very difficult and at times impossible to achieve full inlining. The major difficulty is to reverse engineer the executable image, without slowly preprocessing or scanning the entire image before execution, in order to recover information about the runtime architecture and software convention such as the spills and restore of caller- and callee-save registers, or information about the stack frame layout. In fact, even with a full scan of an executable image, some information simply cannot be retrieved without annotation information. The discovery of runtime architecture and software convention information is further complicated by the difficulty of memory disambiguation when considering only a code fragment. In the absence of additional information the dynamic optimizer must make worst case assumptions which may prevent otherwise safe inlining. Thus, potentially many valuable and safe inlining opportunities cannot be realized due to the inability of the dynamic execution layer to fully reverse engineer procedure runtime architecture and software conventions.

In another embodiment, the dynamic optimizer is incorporated in a binary translator that dynamically translates non-native machine code to native machine code.

Adding information about the computer program through annotations to the executable image enables dynamic optimizers such as those included in the exemplary dynamic execution layer mentioned above to perform aggressive optimizations, including function inlining.

In a preferred exemplary embodiment, the compiler used to produce the computer program executable also annotates the executable image with information about the program. The compiler has information about: (a) the runtime architecture and software conventions used to compile the program; and (b) information about references to individual memory locations. Therefore, the compiler can most simply communicate information and guarantees about the runtime architecture and software conventions in the compiled code to the dynamic optimizer.

The compiler preferably communicates this information through annotations to the executable image, although the information could alternatively be stored and provided to the dynamic optimizer separately. The annotation format, therefore, must be understood by both the compiler and the dynamic optimizer. The annotations consist of information stored with the computer program other than instructions executable by the computer processor or data to be manipulated by the computer program.

Figure 2:
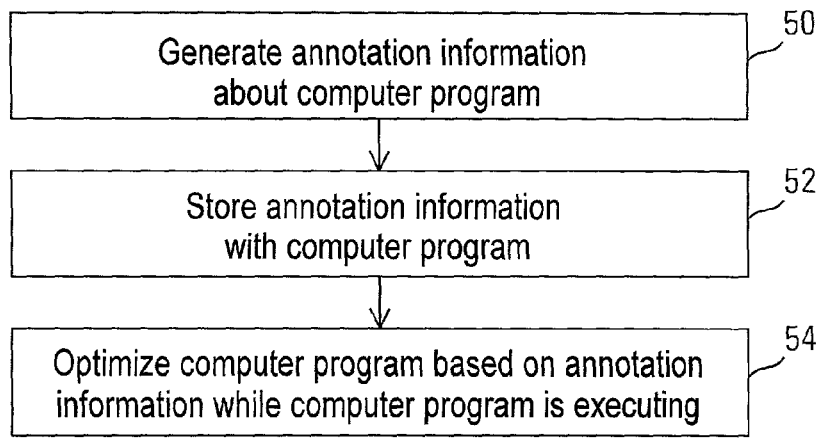
FIG. 2 is an exemplary flow chart illustrating annotating and optimizing a computer program.

The basic procedure involved in annotating and dynamically optimizing a computer program is illustrated in FIG. 2. First, annotation information is generated 50 about the computer program. As mentioned above, this is preferably performed by the compiler during the compilation process, as the compiler has the information needed to generate the annotation, including information about the runtime architecture and software conventions as well as the memory references in the program. The information in a preferred embodiment is related to the stack, although the annotations to executable images for improved dynamic optimization should not be viewed as limited to the particular annotation information illustrated in the exemplary embodiments herein. For example, one type of annotation information which will be described below is a list of memory locations which the compiler guarantees are only accessed by non-ambiguous memory references. The exemplary embodiments herein describe this list with respect to the local stack frame. However, this list may also be generated for other memory locations using more elaborate analyses in the compiler. Therefore, the annotation information is not limited to information about the stack.

The annotation information is stored 52 with the computer program. As mentioned above, the annotation is preferably stored in the compiled executable program. The computer program is then dynamically optimized 54 with the annotation information. The types of optimizations enabled by the annotation depend upon the information included, as will be discussed below.

Figure 3:
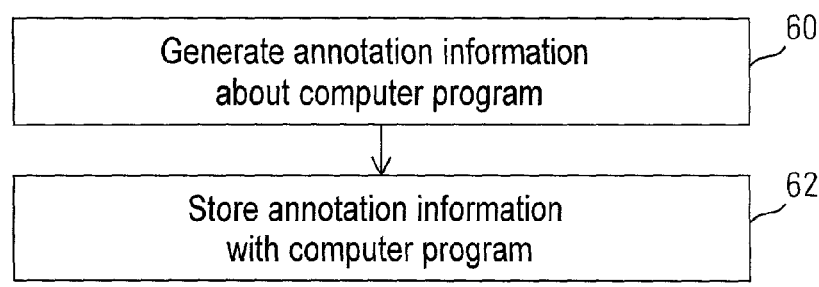
FIG. 3 is an exemplary flow chart illustrating generating and storing annotation information for a computer program.
Figure 4:
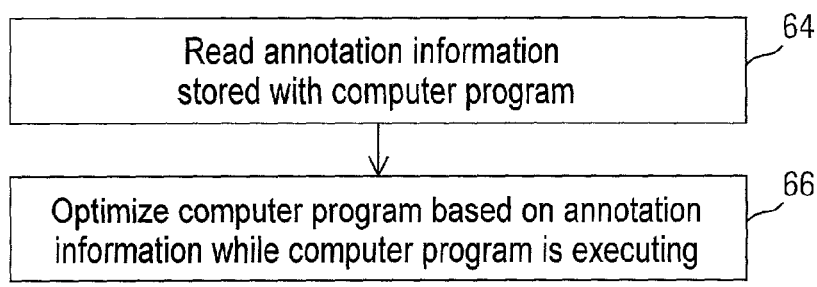
FIG. 4 is an exemplary flow chart illustrating reading annotation information for a computer program and optimizing the program based on the information.

Although the procedure illustrated in FIG. 2 includes both the annotation and optimization, these operations are preferably performed separately by independent tools, as shown in FIGS. 3 and 4. The annotation operation is preferably performed by the compiler during, or after, the compilation process by the compiler. The compiler first generates 60 annotation information about the computer program, then stores the annotation information with the executable image for the computer program. (See FIG. 3) The optimization is then performed by a dynamic optimizer, which reads 64 the annotation information stored with the executable, then optimizes 66 the program during execution based on the information in the annotation.

As mentioned above, it is important to note that the information contained in the annotations is not limited to the information included in the exemplary embodiments described herein. Similarly, the optimizations performed by the dynamic optimizer based on the annotations are not limited to the optimizations included in the exemplary embodiments described herein.

The information stored in the annotation is dependent upon the types of optimizations to be performed. For function inlining, in general, the annotation should contain calling convention information and information about the memory stack. The stack is used to dynamically allocate the local variables (locals) used in functions, to pass parameters to the functions, and to return values from the functions. The stack consists of logical stack frames that are pushed, or added to the stack, when calling a function, and popped, or removed from the stack, when returning from the function. A stack frame may contain the parameters to a function, its local variables, and the data necessary to recover the previous stack frame, including the value of the instruction pointer at the time of the function call. When functions are placed inline, this overhead can be removed if the annotation contains enough information about the stack frame. For example, variables local to the inlined function which are stored on the stack can be promoted to being stored in registers as long as all references to the local variables on the stack can be identified.

Referring now to FIG. 5, the types of information which may be included in an exemplary preferred annotation will be discussed. The types of information will be presented in a preferred order from simplest to most complex, although they need not be ordered in this fashion.

First, the annotation information includes the identity of a unique stack pointer register 70. In order to be able to undo stack frame allocation, the correct identity of a unique stack pointer register 70 is needed. The compiler knows the identity of the unique stack pointer register because of its information about the runtime architecture and software conventions used to compile the program.

Second, the annotation information includes a list 72 of memory locations for which the compiler guarantees that (a) it knows all references to these memory locations; and (b) all of these references are non-ambiguous, that is, each such memory reference instruction individually must reference the exact same memory location each time it is executed. Any item in list 72 can be identified by its index or position in the list.

The entry of an item in list 72 may include a canonical name for the referenced location. The canonical name can be any unique name; the canonical name of a stack frame location is preferably given by a pair (sp,d) where sp identifies the unique stack pointer register and d is an offset from the stack pointer such that d(sp) addresses the stack frame location. Offset d is called the canonical offset of the location.

Note that the canonical names may alternatively be given any format, as long as they uniquely identify the memory locations for which accesses can be optimized. For example, their format may vary depending upon the architecture of the computer system: if the target architecture does not reference stack frame locations with (sp,d), another format may be more convenient or necessary. However, it is most convenient to use (sp,d) for stack locations since this is how the compiler likely names temporary stack locations.

The entry of an item in list 72 may also include the length of the access. The format of the location identifiers of non-ambiguous stack frame locations may thus look as follows:

| Item | Name | Length |
|------|-------|--------|
| 1 | 4(sp) | 4 |
| 2 | 8(sp) | 8 |
| 3 | 16(sp) | 4 |

With the list 72 of location identifiers above, the second location in the list 72 would be at an offset of 8 bytes from the stack pointer, with a length of 8 bytes.

The compiler has complete control over compiler generated stack frame locations for callee-saves registers, arguments, and other local (spill) locations. Thus, the compiler can provide guarantees about the use of canonical names without extensive analysis for these locations. Again, the compiler can provide this list because of its information about the runtime architecture and software conventions used to compile the program. For local variables, the compiler can analyze the code and mark the location of a local as non-ambiguous if its address, or the address of any member of its type, is not taken.

Note that as discussed above, the annotations to executable images are not limited to information related to the stack. Accordingly, the list 72 of location identifiers of non-ambiguous stack frame locations above may contain location identifiers of any non-ambiguous location, not just stack frame locations, as long as the compiler still guarantees that it knows all possible references to any location in the list 72.

The third type of information included in the annotation is a mapping 74 of memory references or accesses to non-ambiguous locations. This mapping 74 may correlate memory references to the non-ambiguous locations by their location identifiers discussed above in the second type of annotation information.

The map 74 contains an entry for each reference in the procedure body for each non-ambiguous location. An exemplary map 74 appears as follows:

| Reference | Referenced Location |
|-----------|---------------------|
| Ld1 | Non-ambiguous location 2 |
| Ld2 | Non-ambiguous location 1 |
| St1 | Non-ambiguous location 3 |

For each reference in a stack frame's scope to a non-ambiguous location, an entry is made to the map 74 which correlates the memory reference or access to the non-ambiguous location or it's canonical name. Note that the exemplary references Ld1, Ld2, and St1 refer to load and store operations in the stack frame's scope, and may comprise any suitable symbolic name or reference to the memory access operations. Any desirable type of location identifier or pointer from memory references to non-ambiguous locations may be used. In this example, the first load operation in the stack frame's scope accesses the second non-ambiguous location, the variable at location 8(sp) having a length of 8 bytes, whose canonical name appears as the second entry in the list 72 above. Alternatively, the map 74 could contain pointers into the list 72 rather than pointers to the non-ambigous ambiguous locations.

The list 72 and map 74 allow the following memory access sequence to be written with a variety of different name formats while still allowing dynamic inlining:

1: loadw rx=4(sp)
2: loadd ry=8(sp)
3: loadw rz=16(sp)

could also be written in the code as:

1: movw ri=sp
2: loadw rx=4(ri++)
3: loadd ry=4(ri++)
4: loadw rz=4(ri)

or as:

1: loadw rx=4(sp++)
2: loadd ry=4(sp++)
3: loadw rz=4(sp)

The same memory locations are accessed but different names for them are used in the three sequences. In fact, assuming no stack pointer modification inside the function, the first example sequence above can be done with only the list 72, as will be discussed below; the second and third example sequences above require the use of map 74 (obviously, the third example sequence modifies the stack pointer inside the function).

In the first sequence, the word rx is loaded from the stack at an offset of 4 from the stack pointer, the double length word ry is loaded from an offset of 8 from the stack pointer, and the word rz is loaded from an offset of 16 from the stack pointer. In the second sequence, the stack pointer is copied into another register ri, and the register ri is used to access the different offsets for the three memory locations. The register ri is incremented to change the accessed offset without altering the stack pointer. In line two of the second sequence, the word rx is loaded from an offset of 4 from ri, which is the same location accessed in line 1 of the first sequence, and so on. In the third sequence, the stack pointer is incremented to access the three memory locations while the offset remains constant. (Note that the constant offset of 4 in the second and third sequences is used to match the offset of 4 in the first line of the first sequence.)

In an alternative embodiment, items may be added to the map 74 only for memory references which use non-canonical names. This option provides for shorter maps 74, but may slow optimization. If the computer architectures or compilers use only canonical names in the generated instructions, the map 74 of memory references in a stack frame's scope to the canonical names of referenced locations for all non-ambiguous locations may not be needed in the annotation.

The map 74 of the third annotation may not be needed if the stack pointer is not modified in the code (see, e.g., the first of the three access sequences above using 4(sp), 8(sp) and 16(sp)), since the dynamic optimizer could simply inspect the code to identify which non-ambiguous location is accessed by a memory reference. This annotation information may also not be needed for some architectures in which it is possible to deduce the information from the instruction stream using only the list of canonical names of non-ambiguous stack frame locations. The facts needed to deduce the information in the third annotation 74 are that a fixed reference point is known (e.g., sp), and that the instructions contain sufficient information to determine the memory location and look it up in the list 72 of non-ambiguous stack frame locations (e.g., a memory reference in the form d[sp]). Normally the stack pointer provides the fixed reference point, but if the stack pointer is modified and the runtime architecture and software conventions organize the local stack frame relative to the previous stack pointer (psp), that would do as well. The deduction of the information in the third annotation 74 would also be based upon whether the architecture provides a base+displacement form for memory references (e.g., IA64 does not, PA-RISC does). The deduction of the information in the third annotation 74 therefore must determine when looking at a memory reference whether it is possible to match the location that is accessed with the list of non-ambiguous stack frame locations in the second annotation 72.

Note that a mixture of the list 72 of non-ambiguous stack frame locations and the map 74 of memory references to non-ambiguous locations can be combined if the map 74 contains all memory references to non-ambiguous locations, not just references to non-ambiguous locations which use canonical names. In this case, the map 74 could be encoded so that the list 72 is not needed.

The fourth type of information included in the annotation is a list 76 of canonical names of stack frame locations that are promotable. A stack frame location is called promotable if the location is only accessed by explicit memory references inside the stack frame's procedure body (e.g., the location cannot be referenced by an exception handler).

The fifth type of information included in the annotation is a guarantee 80 that no stack frame location is live beyond the scope of the stack frame.

The sixth type of information included in the annotation is the format and location of stack unwinding information 82. This information is needed for exception handling that can trigger up the call chain. If inlining-related optimizations have been applied which remove one or more stack frames, the stack unwinding information 82 must also be updated so that exception handling is properly performed.

Annotations one through three (70, 72, and 74) enable the dynamic optimizer to trace register values through memory (through their spill locations). Annotations two through five (72, 74, 76, and 80) enable the dynamic optimizer to remove store instructions and stack frame locations in general.

All this information is readily available to the compiler and it provides the essential knowledge for the dynamic optimizer to enable full inlining and inlining-related optimizations. The information stored in an annotation must be correct, or the program will likely fail when dynamically optimized.

Referring now to FIG. 6, the inlining-related optimizations will be discussed which may be performed based on the information in the exemplary preferred annotation above. The types of optimizations will be presented in a preferred order from simplest to most complex, although they need not be ordered in this fashion.

First, the exemplary annotations above enable removal of redundant callee-save register restores 90. As a function is called, the processor registers contain values which are saved onto the stack frame by the function, or callee, as it is entered. As the function ends, it restores these values from the stack frame back into the processor registers before returning to the caller. The function is therefore able to use the faster registers without disrupting the operation of the caller.

This inlining-related optimization requires that the first three types of information described above (70, 72, and 74) be included in the annotation. With this information it can be recognized by the dynamic optimizer that restoring from a particular non-ambiguous callee-save location is redundant because the location has not been rewritten since the initial register save. In other words, if, after the function saved the registers onto its stack frame, it didn't actually modify the registers, (perhaps because the dynamic optimizer placed part of the function inline) then the function needn't restore the registers before returning to the caller.

This optimization may arise particularly when executing software through a dynamic execution layer, because in a dynamic execution layer only individual paths through a procedure may be inlined rather than the entire procedure body. Most compilers can automatically remove redundant callee-save register restores if a function never overwrites a register. However, there are often multiple paths through a function, some of which may overwrite the register, others which don't. The dynamic execution layer, as described above, identifies each of the traces through the function and treats them separately. Therefore, the traces through the function which don't overwrite the register are eligible for removal of redundant callee-save register restores. The compiler will have left in the callee-save register restores because the function overwrites the register in at least one place.

This may also be generalized to removal of loads from any non-ambiguous location. This optimization does not affect the stack frame contents, it simply eliminates redundant restores from (or accesses to) locations on the stack frame.

The second type of inlining-related optimization is constant argument specialization 92, which is also enabled by the first three types of annotation information (70, 72, and 74) described above. Constant argument specialization 92, or propagation of constants across nested calls, requires that argument values be traced through memory, which the first three types of information above (70, 72, and 74) enable. As a constant is stored in variables, either global or local, in the code, this information allows the dynamic optimizer to trace the constant through the code, evaluate the code, and optimize it. For example, if a constant is stored to a location on the stack frame, and that location is later used in a compare operation to perform a conditional branch, the dynamic optimizer can identify that the location contains the constant. This would enable the dynamic optimizer to determine whether, for example, one of the possible branches has an impossible branch outcome, and remove it from the code dynamically. Examine, for example, the following bit of pseudo-assembly code:

1: movw arg1=c
2: storew 4(sp)=arg1
3: storew 10(r5)=rx
4: loadw r1=4(sp)
5: ifeq r1, c Line 1 sets the variable arg1 equal to constant c. Line 2 stores arg1 to location 4(sp). Line 3 is a store to an ambiguous location. Line 4 loads location 4(sp) to register r1. Line 5 does some action only if register r1 is equal to constant c.

This optimization allows the constant c to be traced and propagated, replacing arg1, 4(sp), and register 1, despite the store to an ambiguous location in line 3. The annotations enable the optimizer to trace the constant c, determine that the compare at line 5 will always be true, and eliminate the false branch of the code.

Again, as described above, many of these inlining-related optimizations arise most often when the code is being dynamically transformed, such as by a dynamic execution layer, and functions have been divided into multiple traces which can be independently optimized.

This optimization also does not affect the stack frame contents, it simply eliminates redundant restores from (or accesses to) locations on the stack frame. This also means that there are no exception handling issues with this optimization.

The third type of inlining-related optimization is register promotion of locals 94, which is enabled by the first five types of annotation information (70, 72, 74, 76, and 80) described above. The first three types of annotation information (70, 72, and 74) are needed to identify non-ambiguous locals that can be held in a register (if available) instead of being held in a stack frame location. The fourth and fifth types of annotation information (76, and 80) are needed to eliminate any store into the stack frame location holding the promoted local.

The fourth type of inlining-related optimization is removal of redundant callee register saves 96 which is enabled by the six types of annotation information (70, 72, 74, 76, 80, and 82) described above. Using the first three types of annotation information (70, 72, and 74) redundant callee-save register restores can be identified (as described in the first optimization 90 above). The fourth and fifth types of annotation information (76, and 80) are needed to ensure that it is save to remove the redundant callee register saves. Note that with this optimization, the stack frame is modified, so the stack unwinding descriptors 82 must be updated as well.

The fifth type of inlining-related optimization is removal of the stack frame allocation 98 which is enabled by the six types of annotation information (70, 72, 74, 76, 80, and 82) described above. If by the above optimizations all local and callee-save registers are promoted or eliminated, the entire stack frame can be eliminated. Note that with this optimization, since the stack frame is eliminated, the stack unwinding descriptors 82 must be updated as well.

An example will now be given of a function inlining optimization which provides the opportunity to apply several of the individual optimizations described above. The following pseudo-assembly code includes several opportunities for dynamic optimization if it is annotated with the appropriate information. This code represents the instructions seen during execution, including a call and return from a function:

1: ldo r26=0xa4(sp)
2: bl r2, .L5
3: ldo sp=−0x40(sp)
4: storew 0x 14(sp)=r25
5: storew 0(r3)=r23
6: loadw r3=0x14(sp)
7: ldo sp=0x40(sp)
8: bv (r2)

Line 1 of the code above loads an argument into register r26. Line 2 calls procedure .L5, with register r2 as the link register. Line 3 updates the stack pointer to allocate the stack frame for the called procedure. (Note that this is a code segment as it would be presented for execution by a processor, not as programmed, so the called procedure, including related stack frame management instructions, appears in the instruction stream.) Lines 4 and 5 are store operations appearing in the body of the called procedure. Line 6 is a potentially redundant load operation in the body of the called procedure. Line 7 deallocates the stack frame by resetting the stack pointer. Line 8 returns from the called procedure.

We would like to inline the function which will remove the call and return branches in lines 2 and 8, as well as the allocation of the stack frame and the redundant load. The resulting optimized code would look like this:

1: ldo r26=0xa4(sp)
5: storew 0(r3)=r23
. . . .
6': movw r3 =r25

Line 1 of the optimized code above loads the argument into register r26. The procedure call and stack frame allocation of lines 2 and 3 of the unoptimized code above are removed, as well as the store to a temporary frame location of line 4. Line 5 is the store operation appearing in the body of the procedure, which is not optimized away. In line 6' the redundant load of the unoptimized code is replaced with a copy from the original location. The frame deallocation and procedure return instructions of lines 7 and 8 of the unoptimized code above are removed.

To be able to do these kinds of optimizations the dynamic optimizer needs information about the instructions that reference the stack locations, particularly for non-ambiguous references. For example, the location 0x14(sp) is non-ambiguous because the compiler can identify all references to this location. In particular, the compiler can guarantee that the store instruction (storew 0(r3)=r23) does not address the stack frame location 0x14(sp). Without this information, the runtime analysis performed by the dynamic optimizer would have to make a conservative worst-case assumption. Since the dynamic optimizer doesn't know anything about the contents of register r3 it is possible that 0(r3) addresses the same location as 0x14(sp). Thus, if line 5 may or may not overwrite location 0x14(sp) the dynamic optimizer cannot determine that the value loaded in line 6 from 014x(sp) is still the same as that stored in line 4. However, if the dynamic optimizer knows that 0x14(sp) is non-ambiguous it also knows that the mapping 74 of memory references in a stack frame's scope to the canonical names of referenced locations for all non-ambigous locations is complete. If the map 74 does not contain an entry for the store in line 5 the dynamic optimizer can safely assume that the store in line 5 does not overwrite location 0x14(sp). Thus, the load in line 6 is redundant because the value is already stored in register r25. So the optimization replaces the load in line 6 with a register move in line 6'. Furthermore if the annotation provides the guarantee 80 that no stack frame location is live beyond the scope of the stack frame (or past the return in line 8), the store in line 4 is useless once the load in line 6 is removed. Therefore the store in line 4 can also be removed.

The annotation for this example needs four types of information: the identity of a unique stack pointer register 70, a list 72 of canonical names of non-ambigous stack frame locations, a mapping 74 of memory references in a stack frame's scope to the canonical names of referenced locations for all non-ambiguous locations, (or combined list and map 74) and a guarantee 80 that no stack frame location is live beyond the scope of the stack frame. The annotation for this example may appear as follows:

1) sp
2) (0x14,sp) or just (0x14)—this is the only stack location for which all references are non-ambiguous
3) 4: >(0x14,sp) store address mapped
4) 6: >(0x14,sp) load address mapped
5) (0x14,sp) not live after line 8

If the compiler supports stack unwinding, the stack unwinding mechanism provides an ideal vehicle to embed the annotations. If the stack unwinding mechanism does not exist, a similar structure can be defined. Stack unwinding descriptors typically already contain a pointer 70 to the unique stack pointer. The second and third types of annotation information described above can additionally be embedded into the stack unwinding descriptor in the form of two tables, a non-ambiguous location table 72 and a memory reference map 74. If a memory reference in the code addresses the location by its canonical name, it is not necessary to query the memory reference map 74 and the canonical offset can be directly deduced from the reference address. Thus, to optimize the memory reference map 74, entries may be made for only references with non-canonical addresses, as discussed above. The list 76 of canonical names of promotable stack frame locations can also be embedded in the descriptor in table form, while the last two types of annotation information 80 and 82 can be hardcoded into the inliner if the executable image is generated properly.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of enabling dynamic optimization of a computer program, comprising:
   generating annotation information about said computer program, said annotation information being derived from information held by a compiler about references to individual memory locations; and
   storing said annotation information with said computer program, said annotation information enabling a dynamic optimizer to optimize said computer program during execution.

2. The method of claim 1, wherein generating annotation information comprises generating annotation information enabling replacement of subroutine calls with inline program code in said computer program while said computer program is being executed.

3. The method of claim 1, wherein generating annotation information comprises a compiler generating said annotation information.

4. The method of claim 1, wherein said computer program comprises at least one executable file.

5. The method of claim 1, wherein said computer program comprises at least one source file.

6. The method of claim 1, wherein said generating annotation information comprises generating annotation information derived from runtime architecture and software conventions.

7. The method of claim 1, wherein said generating annotation information comprises generating annotation information identifying a unique stack pointer register to be used by said computer program.

8. The method of claim 1, wherein said generating annotation information comprises generating annotation information comprising a list of non-ambiguous memory locations.

9. The method of claim 8, wherein said annotation information enables said dynamic optimizer to obtain canonical names for said non-ambiguous memory locations.

10. The method of claim 8, wherein said non-ambiguous memory locations comprise stack frame locations.

11. The method of claim 1, wherein said generating annotation information comprises generating annotation information comprising a mapping of memory references to all non-ambiguous locations which are referenced.

12. The method of claim 1, wherein said generating annotation information comprises generating annotation information comprising a list of canonical names of stack frame locations that are promotable.

13. The method of claim 1, wherein said generating annotation information comprises generating annotation information comprising a guarantee that no stack frame location is live beyond the scope of the stack frame.

14. The method of claim 1, wherein said generating annotation information comprises generating annotation information comprising a format and a location of stack unwinding information.

15. A method of dynamically optimizing a computer program, comprising:
   reading annotation information derived from runtime architecture and software conventions used to compile said computer program, said annotation information also being derived from information held by compiler about references to individual memory locations, said annotation information being stored with said computer program; and
   dynamically optimizing said computer program based on said annotation information while said computer program is being executed.

16. The method of claim 15, wherein said dynamically optimizing said computer program comprises a binary translator optimizing said computer program.

17. The method of claim 15, wherein said dynamically optimizing said computer program comprises replacing subroutine calls in said computer program with inline program code.

18. The method of claim 15, wherein said dynamically optimizing said computer program comprises removing redundant callee-save register restores.

19. The method of claim 15, wherein said dynamically optimizing said computer program comprises propagating constant arguments within said computer program.

20. The method of claim 15, wherein said dynastically optimizing said computer program comprises promoting local data from a stack frame location to a register.

21. The method of claim 15, wherein said dynamically optimizing said computer program comprises removing redundant callee register saves.

22. The method of claim 15, wherein said dynamically optimizing said computer program comprises removing stack frame allocation.

23. Apparatus for enabling dynamic optimization of a computer program, the apparatus comprising:
- one or more computer readable storage media; and
- computer executable instructions stored in the one or more computer readable storage media, the computer executable instructions comprising:
  - instructions for generating annotation information about said computer program, wherein said annotation information enables a dynamic optimizer to optimize said computer program during execution, said annotation information being derived from information held by a compiler about references to individual memory locations; and
  - instructions for storing said annotation information with said computer program.

* * * * *

UNITED STATES PATENT AND TRADEMARK OFFICE
CERTIFICATE OF CORRECTION

| | |
|---|---|
| PATENT NO. | : 6,993,754 B2 |
| APPLICATION NO. | : 09/992642 |
| DATED | : January 31, 2006 |
| INVENTOR(S) | : Stefan M. Freudenberger et al. |

It is certified that error appears in the above-identified patent and that said Letters Patent is hereby corrected as shown below:

On the Title page, in field (54), in "Title", in column 1, line 2, after "OPTIMIZATION" insert -- OF --.

In column 1, line 2, after "OPTIMIZATION" insert -- OF --.

In column 8, line 24, delete "non-ambigous ambiguous" and insert -- non-ambiguous --, therefor.

In column 13, line 15, delete "4: >(0x14,sp)" and insert -- 4: ->(0x14,sp) --, therefor.

In column 13, line 16, delete "6: >(0x14,sp)" and insert -- 6: ->(0x14,sp) --, therefor.

In column 14, line 39, in Claim 15, after "by" insert -- a --.

In column 14, line 59, in Claim 20, delete "dynastically" and insert -- dynamically --, therefor.

Signed and Sealed this

Twenty-first Day of April, 2009

JOHN DOLL
*Acting Director of the United States Patent and Trademark Office*